(12) United States Patent
Saika et al.

(10) Patent No.: US 6,180,175 B1
(45) Date of Patent: Jan. 30, 2001

(54) COATING COMPOSITION

(75) Inventors: Masaaki Saika; Yoshiyuki Yukawa, both of Hiratsuka; Motoshi Yabuta, Hadano; Seiji Wada, Oiso-machi; Kohsuke Noura, Hiratsuka; Yasumasa Okumura, Nisshin, all of (JP)

(73) Assignee: Kansai Paint Co., Ltd., Hyogo-ken (JP)

( * ) Notice: Under 35 U.S.C. 154(b), the term of this patent shall be extended for 0 days.

(21) Appl. No.: 09/177,082

(22) Filed: Oct. 23, 1998

(30) Foreign Application Priority Data

Oct. 24, 1997 (JP) .................................................. 9-291867
Nov. 10, 1997 (JP) .................................................. 9-306709
Nov. 21, 1997 (JP) .................................................. 9-336583

(51) Int. Cl.$^7$ ....................................................... B05D 3/02
(52) U.S. Cl. ........................................ 427/387; 427/407.1
(58) Field of Search ................................. 427/387, 407.1

(56) References Cited

U.S. PATENT DOCUMENTS

| | | | | |
|---|---|---|---|---|
| 3,919,351 | * | 11/1975 | Chang et al. | 260/850 |
| 3,983,291 | * | 9/1976 | Chang | 428/290 |
| 4,425,450 | * | 1/1984 | Horvath | 523/334 |
| 4,582,873 | * | 4/1986 | Gaa et al. | 524/591 |
| 4,677,179 | * | 6/1987 | Hannemann | 528/45 |
| 4,873,298 | * | 10/1989 | Ryntz | 525/479 |
| 4,886,862 | * | 12/1989 | Kuwamura et al. | 526/247 |
| 4,913,972 | * | 4/1990 | Grunewalder et al. | 427/408 |
| 5,198,503 | * | 3/1993 | Numa et al. | 525/288 |
| 5,348,998 | * | 9/1994 | Ito et al. | 524/190 |
| 5,736,090 | * | 4/1998 | Yamamoto et al. | 264/255 |
| 5,741,552 | * | 4/1998 | Takayama et al. | 427/410 |

* cited by examiner

*Primary Examiner*—Erma Cameron
(74) *Attorney, Agent, or Firm*—Wenderoth, Lind & Ponack, L.L.P.

(57) ABSTRACT

There is disclosed a novel organic solvent type coating composition capable of making the solid content concentration at the time of coating to higher than 70% by weight, without lowering the properties, which urethane type coating materials have, such as acid resistance, scratch resistance, finishing appearance etc. The composition comprises (A) a vinyl type polymer having both hydroxyl groups and alkoxysilyl groups in the molecule and having a number-average molecular weight in a range of 2,000 to 10,000; (B) a polyol compound having a number-average molecular weight of less than 1,000 and having a hydroxyl value in a range of 120 to 1,000 mgKOH/g; (C) a polyisocyanate compound having a number-average molecular weight of less than 2,000; and (D) a silanol group forming catalyst.

23 Claims, No Drawings

COATING COMPOSITION

BACKGROUND OF THE INVENTION

1. Field of the Invention

The present invention relates to a coating composition capable of being cured by crosslinking by a urethanization reaction of a hydroxyl group and an isocyanate group and being made to a high solid content type having more than 70% by weight of solid content at the time of coating, and relates to a multilayer coating film formation process using the composition.

2. Description of the Prior Art

In the field of coating materials, the reduction of amount of usage of organic solvents is an urgent matter from a viewpoint of environmental conservation against atmospheric pollution and saving of resources etc.

As one of the countermeasures, there is mentioned the development of so-called "high solid content coating materials" in which the amount of usage of organic solvents in the coating materials is reduced to obtain a high solid content concentration in the organic solvent type coating materials.

Most of the high solid content coating materials currently under development contain as resin component a hydroxyl group-containing resin compounded with a melamine resin as a curing agent. Such coating materials, however, have the following disadvantages.

Firstly, it is necessary to make the viscosity of hydroxyl group-containing resin and melamine resin lower in order to achieve a high solid content concentration. However, when the molecular weight of these resins is made lower, there arises a problem that the properties of the coating film are lowered. In order to realize lower molecular weight of resins and sufficient properties of the coating film at the same time, it is necessary to have a higher content of crosslinking functional groups, such as hydroxyl group, methylol group etc. in the resin. However, crosslinking functional groups generally increase the viscosity due to a mutual action among functional groups, and there arises a problem that the lowering of viscosity becomes difficult, if the content of functional groups is higher.

Secondly, in case a high solid content coating material is a coating material using melamine resin as curing agent, a large amount of by-products such as alcohol at the time of curing by heating are generated and there arises a problem that popping caused by baking happens in the coating film quite often.

Moreover, in the top coating film of automobile outer plates etc. to be used outdoors, etching and stains caused by the acid rain are worldwide problems. Another problem is scratches caused by a car-washing machine as the machine has been popularized. Therefore, there has been demanded a development of a coating material for top coat, especially a clear coating for top coat which can form a coating film having both enough acid resistance against acid rain etc. and scratch resistance. The coating film obtained from the coating material containing resins of a combination of the above-mentioned hydroxyl group-containing acrylic resin and a melamine resin has a problem of inferior acid resistance and scratch resistance.

Urethane type coating materials, which are crosslinked and cured by a urethanization reaction between a hydroxyl group and an isocyanate group, can form a cured coating film excellent in acid resistance, scratch resistance, coating appearance (for example, gloss, fatness, image sharpness) etc. and are widely used. However, it is difficult for the urethane type coating materials to bring the solid content at the time of coating to a higher solid content concentration of more than 70% by weight, without deteriorating these properties and therefore their applications are limited in recent years where prevention of atmospheric pollution and saving resources are seen as important, without being able to sufficiently utilize the above-mentioned advantages.

The purpose of the present invention is to propose a urethane type coating composition capable of being made the solid content at the time of coating to more than 70% by weight, without deteriorating good properties, which a urethane type coating material has, such as acid resistance, scratch resistance, finishing appearance etc. and a multilayer coating film formation process using the coating composition.

As a result of an extensive study, the present inventors have found that the above-mentioned purpose can be achieved by a coating material comprising a vinyl type polymer having both silylated hydroxyl groups and alkoxysilyl groups, low molecular weight polyol, polyisocyanate compounds and a silanol group forming catalyst, and optionally containing a small amount of an organotin compound, and completed the present invention.

SUMMARY OF THE INVENTION

Thus the present invention proposes an organic solvent-based coating composition comprising (A) a vinyl polymer having hydroxyl groups and alkoxysilyl groups in the molecule and having a number-average molecular weight in a range of 2,000 to 10,000;

(B) a polyol compound having a number-average molecular weight of not more than 1,000 and having a hydroxyl value in a range of 120 to 1,000 mgKOH/g;

(C) a polyisocyanate compound having a number-average molecular weight of not more than 2,000;

(D) a silanol group-forming catalyst; and (E) 0 to 0.1 part by weight of a urethanization catalyst per 100 parts by weight of the total of the above-mentioned polymer (A), polyol compound (B) and polyisocyanate compound (C).

The present invention also proposes a coating film-formation process characterized by using the above-mentioned coating composition as the clear coating material of at least top layer in a process of forming a multilayer coating film by coating by turns at least one color coating material and at least one clear coating material.

DETAILED DESCRIPTION OF THE INVENTION

Each component of the coating composition of the present invention etc. are hereinafter described in more detail.

Vinyl polymer (A)

The vinyl polymer (A) used in the present invention is a vinyl polymer having both hydroxyl groups and alkoxysilyl groups in the molecule.

The above-mentioned vinyl polymer (A) may easily be obtained, for example, by copolymerizing a vinyl monomer having a hydroxyl group(s), a vinyl monomer having a hydrolyzable alkoxysilyl group(s), and optionally another vinyl monomer.

As the above-mentioned vinyl monomer having a hydroxyl group(s), there can be mentioned, for example, $C_2$–$C_8$, hydroxyalkyl esters of acrylic acid or methacrylic acid, such as 2-hydroxyethyl (meth)acrylate, 2-hydroxypropyl (meth)acrylate, 3-hydroxypropyl (meth)acrylate, hydroxybutyl (meth)acrylate etc.; monoesters of a polyether polyol such as polyethylene glycol, polypropylene glycol, polybutylene glycol etc. with an unsaturated carboxylic acid such as (meth)acrylic acid etc.; monoethers of a polyether polyol such as polyethylene glycol, polypropylene glycol, polybutylene glycol etc. with an unsaturated monomer having a hydroxyl group(s) such as 2-hydroxyethyl (meth)acrylate etc.; monoesters or diesters of an unsaturated compound having an acid anhydride group(s) such as maleic anhydride, itaconic anhydride etc. with a glycol such as ethylene glycol, 1,6-hexanediol, neopentyl glycol etc.; hydroxyalkyl vinyl ethers such as hydroxyethyl vinyl ether; allyl alcohol; adducts of an α,β-unsaturated carboxylic acid with a monoepoxy compound such as Cardura E10 (Made by Shell Chemicals, Co., Ltd., Trade name) and α-olefin epoxide; adducts of glycidyl (meth)acrylate with a monobasic acid, such as acetic acid, propionic acid, p-tert-butylbenzoic acid and fatty acid; adducts of an above-mentioned monomer having a hydroxyl group(s) with a lactone (for example, ε-caprolactone, γ-valerolactone etc.).

A vinyl monomer having a hydrolyzable alkoxy-silyl group(s) is a monomer which forms a silanol group(s) by hydrolysis and includes compounds having each one or more alkoxysilyl groups and polymerizable unsaturated groups in the molecule, specifically, for example, vinyltrimethoxysilane, vinylmethyldimethoxysilane, vinyltriethoxysilane, vinylmethyldiethoxysilane, vinyltris(2-methoxyethoxy)silane, γ-(meth)acryloyloxypropyltrimethoxysilane, γ-(meth)acryloyloxypropyltriethoxysilane, γ-(meth)acryloyloxypropyltripropoxysilane, γ-(meth)acryloyloxypropylmethyldimethoxysilane, γ-(meth)acryloyloxypropylmethyldiethoxysilane, γ-(meth)-acryloyloxypropylmethyldipropoxysilane, vinyltriacetoxysilane, β-(meth)acryloyloxyethyltrimethoxysilane, γ-(meth)acryloyloxybutylphenyldimethoxysilane, γ-(meth)-acryloyloxybutylphenyldiethoxysilane, γ-(meth)acryloyloxybutylphenyldipropoxysilane, γ-(meth)acryloyloxypropyldimethylmethoxysilane, γ-(meth)acryloyloxypropyl-dimethylethoxysilane, γ-(meth)acryloyloxypropylphenyl-methylmethoxysilane, γ-(meth)acryloyloxypropylphenyl-methylethoxysilane etc. Among these, from the viewpoint of low temperature curing property and storage stability, hydrolyzable alkoxysilyl groups are preferably methoxysilyl group or ethoxysilyl group.

As another vinyl monomer, which is optionally used to obtain a vinyl polymer (A), for example, (meth)-acrylic acid esters can be mentioned.

As examples of the above-mentioned (meth)-acrylic acid esters there can be mentioned $C_1$–$C_{22}$ alkyl esters or cycloalkyl esters of acrylic acid or meth-acrylic acid, such as methyl acrylate, ethyl acrylate, n-propyl acrylate, isopropoyl acrylate, (n-, iso- or tert-)butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropoyl methacrylate, (n-, iso- or tert-)butyl methacrylate, hexyl methacrylate, 2-ethylhexyl methacrylate, octyl methacrylate, decyl methacrylate, lauryl methacrylate, stearyl methacrylate, cyclohexyl methacrylate etc.; $C_2$–$C_{18}$ alkoxyalkyl esters of acrylic acid or meth-acrylic acid, such as methoxybutyl acrylate, methoxybutyl methacrylate, methoxyethyl acrylate, methoxyethyl methacrylate, ethoxybutyl acrylate, ethoxybutyl methacrylate etc. As another vinyl monomer, besides (meth)acrylic acid esters, there can be mentioned, for example, aminoalkyl acrylate type monomers, such as N,N-dimethylaminoethyl (meth)acrylate, N,N-diethylaminoethyl (meth)acrylate, N-tert-butylaminoethyl (meth)-acrylate, N,N-dimethylaminopropyl (meth)acrylate; acrylamide type monomers, such as acrylamide, methacrylamide, N-methyl (meth)acrylamide, N-ethyl(meth)acrylamide, N-butyl (meth)acrylamide, N,N-dimethyl(meth)acrylamide; carboxyl group-containing monomers, such as unsaturated monocarboxylic acids such as acrylic acid or methacrylic acid, unsaturated dicarboxylic acids or their modified products such as maleic acid, itaconic acid, fumaric acid, methaconic acid and their acid anhydides or half esters; glycidyl group-containing monomers, such as glycidyl acrylate, glycidyl methacrylate etc.; aromatic vinyl compounds such as styrene, α-methylstyrene, vinyl-toluene etc.; acrylonitrile, vinyl acetate, vinyl chloride etc.

A vinyl type polymer (A) can be obtained by copolymerizing the above-mentioned vinyl monomer having a hydroxyl group(s) and vinyl monomer having a hydrolyzable alkoxysilyl group(s) as essential components, and optionally another vinyl monomer according to a usual method. For example, a polymer (A) can be obtained by a solution polymerization of the above-mentioned monomer components in the presence of a radical polymerization initiator. As a radical polymerization initiator, per se known peroxides or azo compounds may be used. Polymerization may be conducted under a condition of heating at about 60 to 160° C. for about 1 to 15 hours.

Using ratio of the above-mentioned monomers may be selected suitably according to the application purposes of the coating composition of the present invention and generally the following ratios in the total of monomers are appropriate. Namely, the amount of the vinyl monomer having a hydroxyl group(s) is appropriate, from the viewpoint of curing property, storage stability; acid resistance, scratch resistance, water resistance, adhesion of the coating film, 3–50% by weight, preferably 10 to 40% by weight, and more preferably 15 to 35% by weight. The amount of the vinyl monomer having a hydrolyzable alkoxysilyl group(s) may be, from the viewpoint of curing property; acid resistance, scratch resistance of the coating film, cost etc. 3–40% by weight, preferably 4 to 30% by weight, and more preferably 5 to 20% by weight. Another vinyl monomer is used appropriately in a range of 10–80% by weight, preferably 30 to 70% by weight, and more preferably 45 to 65% by weight. In case of using styrene as one of other vinyl monomers, its appropriate using amount is up to about 20% by weight from the viewpoint of weather resistance of the cured coating film.

By polymerization of monomers in the above-mentioned copolymerization ratios, the obtained polymer (A) may have a hydroxyl group value in a range of usually 10–200 mgKOH/g, particularly 40–170 mgKOH/g, and more particularly 70–140 mgKOH/g, and a hydrolyzable alkoxysilyl group content in a range of 0.3–5 mmol/g, preferably 0.6–4 mmol/g, and more preferably 1–3 mmol/g.

The polymer (A) may have a number-average molecular weight in a range of 2,000–10,000, preferably 2,500–8,500, and more preferably 3,000–7,000. When the number-average molecular weight of the polymer (A) is less than 2,000, the curing property and the weather resistance of the cured coating film tend to decrease and when it exceeds 10,000 the viscosity tends to increase and neither of them is preferable.

Moreover, the polymer (A) may have at least partly, preferably not less than 20 mol %, and more preferably not less than 50 mol % of the existing hydroxyl groups in the form of the silylated hydroxyl group represented by the following formula

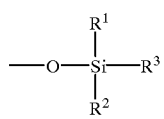

(1)

wherein $R^1$ and $R^2$ are same or different and each represents $C_{1-18}$ alkyl group, $C_{1-6}$ alkoxyl group, aryl group, aralkyl group, tri-methylsiloxy group, hydrogen atom, chlorine atom or fluorine atom and $R^3$ represents $C_{1-18}$ alkyl group, aryl group, aralkyl group or trimethylsiloxy group.

By silylation of a hydroxyl group the viscosity of the coating material can be lowered.

As $C_{1-18}$ alkyl group represented by $R^1$, $R^2$ or $R^3$ in the above-mentioned formula (1) there can be mentioned, for example, methyl, ethyl, n-propyl, isopropyl, n-butyl, isobutyl, tert-butyl, hexyl, 2-ethylhexyl, n-octyl, dodecyl, octadecyl groups etc.; as aryl group, for example, phenyl, tolyl, naphthyl etc.; as aralkyl, for example, benzyl, phenethyl etc. As $C_{1-6}$ alkoxyl group represented by $R^1$ or $R^2$ there can be mentioned methoxy, ethoxy, n-propoxy, isopropoxy, n-butoxy, isobutoxy, tert-butoxy, hexoxy groups etc.

As the above-mentioned silylated hydroxyl group, among the groups represented by the above-mentioned formula (1), it is preferable that $R^1$, $R^2$ and $R^3$ each represents methyl group or ethyl group from the point of reactivity and that volatilization amount of the blocking agent, which volatilizes at the time of curing. Particularly the trimethylsiloxy group, where each of $R^1$, $R^2$ and $R^3$ is a methyl group, is preferable.

A polymer (A) having hydroxyl groups in the polymer in the silylated form can be obtained, for example, by conducting a copolymerization using, replacing the above-mentioned vinyl monomer having a hydroxyl group(s) at least partly, with vinyl monomer, in which said hydroxyl groups are silylated.

As a process to silylate the hydroxyl group of the above-mentioned vinyl monomer having a hydroxyl group(s), for example, the following processes (a) and (b) can be mentioned.

(a) Process of reacting a vinyl monomer having a hydroxyl group(s) and an iminodisilane compound according to the following reaction formula (2):

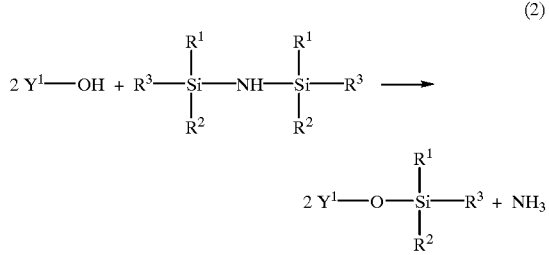

(2)

(b) Process of reacting a vinyl monomer having a hydroxyl group(s) and a chlorosilane compound according to the following reaction formula (3):

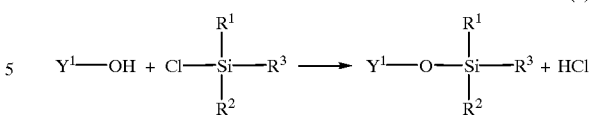

(3)

In the above-mentioned reaction formulae (2) and (3), $Y^1$—OH represents a vinyl monomer having a hydroxyl group, Y represents the residue except the hydroxyl group in a vinyl monomer having a hydroxyl group and $R^1$, $R^2$ and $R^3$ have the same meaning as mentioned above. Each two $R^1$, $R^2$ and $R^3$ in the reaction formula (2) may be same or different.

While a polymer (A) having silylated hydroxyl groups can be obtained by conducting a copolymerization using a vinyl monomer having a silylated hydroxyl group(s) as mentioned above, it can be obtained also by the following process.

For example, in case of obtaining a polymer (A) by a copolymerization, a polymer (A) having silylated hydroxyl groups can be obtained by conducting a copolymerization using a vinyl monomer having a non-silylated hydroxyl group(s), instead of a vinyl monomer having a silylated hydroxyl group(s), and then by silylating the hydroxyl groups in the copolymer. Silylation of the hydroxyl groups in the copolymer can be conducted by reacting the above-mentioned copolymer having non-silylated hydroxyl groups, instead of a vinyl monomer having a hydroxyl group(s), in the above-mentioned reaction formulae (2) or (3).

Polyol compound (B)

Polyol compound (B) is a compound having two or more, preferably three or more hydroxyl groups in the molecule, a molecular weight in a range of not more than 1,000, preferably 200–900, and more preferably 250–600, and a hydroxyl value in a range of 120–1,000 mgKOH/g, preferably 150–800 mgKOH/g, and more preferably 200–650 mgKOH/g.

In a polyol compound (B), when less than two hydroxyl groups are in the molecule, the curing property of the composition becomes insufficient, and when the molecular weight exceeds 1,000, the viscosity of the composition becomes so high that the coating material can not contain sufficiently high solid content. When the hydroxyl value of a compound (B) is less than 120 mgKOH/g, the curing property of the composition decreases, and when it exceeds 1,000 mgKOH/g, the viscosity tends to increase due to hydrogen bond between hydroxyl groups each other and the water resistance of the obtained coating film becomes lower.

Polyol compound (B) can contribute to the curing of the coating film, at the time of curing by heating of the coating film, by reacting with isocyanate groups in a polyisocyanate compound (C), hydrolyzable alkoxysilyl groups in a polymer (A) etc., and to lower the viscosity of the coating material due to its low molecular weight.

As a polyol compound (B) a compound meeting the above-mentioned conditions can be used without special restriction. As a preferable polyol compound (B) there can be mentioned, for example, a compound represented by the following formula

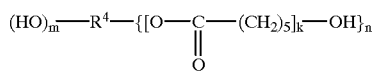

(4)

wherein $R^4$ represents $C_{2-10}$ (m+n) valent hydrocarbon group, k is an integral number of 1–3, m is an integral number of 0–2, n is an integral number of 1–3, and (m+n) is an integral number of 2–4.
acryl oligomer etc.

As a $C_{2-10}$ (m+n) valent hydrocarbon group represented by $R^4$ in the above-mentioned formula there can be mentioned, for example, groups represented by the following formulae.

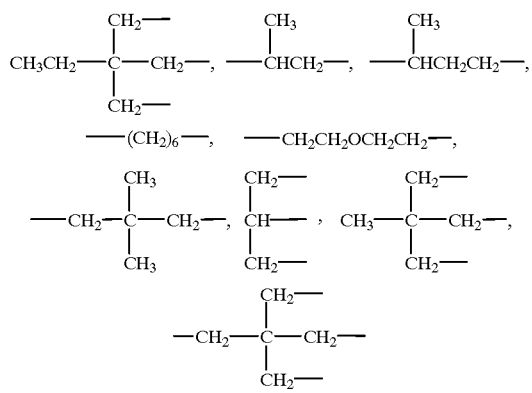

Hydroxyl groups in the above-mentioned polyol compound (B) may be at least partly silylated. By silylation of hydroxyl groups, the viscosity of the coating material can be further lowered. By silylating not less than 20 mol %, preferably not less than 50 mol % of the existing hydroxyl groups, the effect of lowering the viscosity can be further increased. A silylated hydroxyl group in a polyol compound (B) can be in the form represented by the following formula (5).

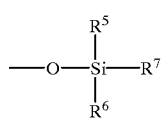

(5)

wherein $R^5$ and $R^6$ are same or different and each represents $C_{1-18}$ alkyl group, $C_{1-6}$ alkoxyl group, aryl group, aralkyl group, tri-methylsiloxy group, hydrogen atom, chlorine atom or fluorine atom and $R^7$ represents $C_{1-18}$ alkyl group, aryl group, aralkyl group or trimethylsiloxy group.

As $C_{1-18}$ alkyl group represented by $R^5$, $R^6$ or $R^7$ in the above-mentioned formula (5) there can be mentioned, for example, methyl, ethyl, n-propyl, isopropyl, n-butyl, isobutyl, tert-butyl, hexyl, 2-ethylhexyl, n-octyl, dodecyl, octadecyl groups etc.; as aryl group, for example, phenyl, tolyl, naphthyl etc.; as aralkyl, for example, benzyl, phenethyl etc. As $C_{1-6}$ alkoxyl group represented by $R^5$ or $R^6$ there can be mentioned methoxy, ethoxy, n-propoxy, isopropoxy, n-butoxy, iso-butoxy, tert-butoxy, hexoxy groups etc.

As the above-mentioned silylated hydroxyl group, among the groups represented by the above-mentioned formula (5), it is preferable that $R^5$, $R^6$ and $R^7$ each represents methyl group or ethyl group from the point of reactivity and that volatilization amount of the blocking agent, which volatilizes at the time of curing. Particularly the trimethylsiloxy group, where $R^5$, $R^6$ and $R^7$ are all methyl groups, is preferable.

As a process to silylate the hydroxyl group of the above-mentioned polyol compound (B), for example, the following processes (c) and (d) can be mentioned.

(c) Process of reacting a polyol compound (B) and an iminodisilane compound according to the following reaction formula (6):

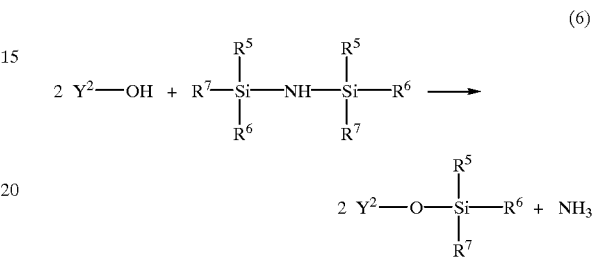

(6)

(d) Process of reacting the hydroxyl group of a polyol compound (B) and a chlorosilane compound according to the following reaction formula (7):

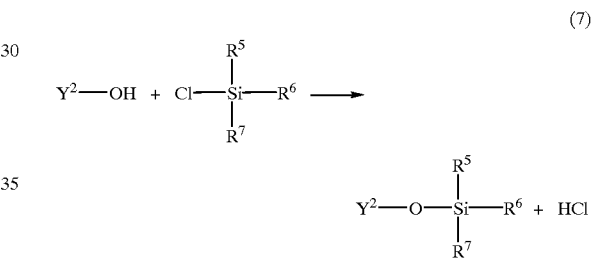

(7)

In the above-mentioned reaction formulae (6) and (7), $Y^2$-OH represents a polyol compound (B) and $R^5$ $R^6$ and $R^7$ have the same meaning as mentioned above. Each two $R^5$, $R^6$ and $R^7$ in the reaction formula (6) may be same or different each other.

Polyisocyanate compound (C)

Polyisocyanate compound (C) is a compound having two or more isocyanate groups in the molecule and a number-average molecular weight of less than 2,000, preferably less than 1,000 and crosslinking by reactions with functional groups such as hydroxyl groups etc. in a polymer (A) and/or a polyol compound (B). When the number-average molecular weight of a polyisocyanate compound exceeds 2,000, the coating material cannot contain sufficient amount of solid content due to an increased viscosity of the coating composition.

As a polyisocyanate compound (C) there can be mentioned, for example, organic diisocyanates, such as aliphatic diisocyanates such as hexamethylene diisocyanate, trimethylhexamethylene diisocyanate, dimeric acid diisocyanate, lysine diisocyanate etc.; alicyclic diisocyanates, such as hydrogenated xylylene diisocyanate, cyclohexylene diisocyanate, methylene bis (cyclohexylisocyanate), isophorone diisocyanate etc.; aromatic diisocyanates such as tolylene diisocyanate, phenylene diisocyanate, 4,4'-diphenylmethane diisocyanate, xylylene diisocyanate, tetramethylxylylene diisocyanate, naphthalene diisocyanate etc.; tri- and higher valent organic polyisocyanate compounds such as 2-isocyanatoethyl-2,6-diisocyanatocaproate, 4-isocyanatomethyl-1,8-octamethylene diisocyanate (generically triaminononane triisocyanate), 3-isocyanatomethyl-1,6-hexamethylene diisocyanate, triphenylmethane-4,4',4''-triisocyanate, 1,3,5-triisocyanatobenzene, 2,4,6-triisocyanatotoluene, 4,4'-dimethydiphenylmethane-2,2',5,5'-tetraisocyanate etc.; dimers or trimers of these divalent or tri- and higher valent organic polyisocyanates; adducts formed by reacting these divalent or tri- and higher valent organic polyisocyanates with polyhydric alcohols, low molecular weight polyester resins or water etc. under the conditions of excess of isocyanato groups. Moreover, blocked polyisocyanates, in which free isocyanate groups of the above-mentioned isocyanate compounds having free isocyanato groups have been blocked by a blocking agent such as phenols, oximes, lactams, alcohols, mercaptans etc., may also be used as polyisocyanate compound (C).

As polyisocyanate compounds (C), above all, low viscosity polyisocyanate compounds such as 2-isocyanatoethyl-2,6-diisocyanatocaproate, 4-isocyanato-methyl-1,8-octamethylene diisocyanate etc. are preferable from the viewpoint of higher solid content. Low viscosity polyisocyanate compounds can have a viscosity of usually less than 500 mPa.s (millipascal.second), more preferably less than 200 mPa.s at 100% solid content at 20° C.

Silanol group-forming catalyst (D)

Silanol group-forming catalyst (D) compounded in the coating composition of the present invention is a catalyst to promote the formation of silanol groups by hydrolysis of the alkoxysilyl groups in the above-mentioned polymer (A) and consequently has an action of promoting crosslinking reaction between the hydroxyl groups in the polymer (A) and/or polyol compound (B) and the alkoxysilyl groups in the polymer (A).

As a silanol group-forming catalyst (D) having such actions there can be mentioned, for example, organic sulphonic acid compounds such as dodecylbenzenesulphonic acid, paratoluenesulphonic acid, dinonylnaphthalenesulphonic acid, dinonylnaphthalenedisulphonic acid, trifluoromethanesulphonic acid etc.; amine neutralization products of these organic sulphonic acid compounds; phosphoric acid compounds and phosphate compounds such as monobutyl phosphate, dibutyl phosphate, monoisopropyl phosphate, diisopropyl phosphate, monooctyl phosphate, dioctyl phosphate, monodecyl phosphate, didecyl phosphate, metaphosphoric acid, orthophosphoric acid, pyrophosphoric acid, trimethyl phosphate, triethyl phosphate, tributyl phosphate, trioctyl phosphate, tributoxyethyl phosphate, tris-chloroethyl phosphate, triphenyl phosphate, tricresyl phosphate etc.

The compounding ratio of the essential components of the composition of the present invention, vinyl polymer (A), polyol compound (B), polyisocyanate compound (C) and silanol group-forming catalyst (D) can be generally as follows: the compounding ratio of the polymer (A) and the compound (B) is appropriate usually in the following range per 100 parts by weight of the total solid content of both.

Polymer (A): 20–60 parts by weight, preferably 25–55 parts by weight, and more preferably 30–50 parts by weight, compound (B): 40–80 parts by weight, preferably 45–75 parts by weight, and more preferably 50–70 parts by weight.

The compounding ratio of the compound (C), in equivalent ratio between the total hydroxyl groups (including the silylated hydroxyl groups) in the polymer (A) and the compound (B) and the isocyanate groups in the compound (C), the former: the latter can be generally 1:0.5–0.5:1, preferably 1:0.6–0.6:1, and more preferably 1:0.7–0.7:1.

The compounding ratio of the silanol group-forming catalyst (D) is appropriate in a range of 0.01–5 parts by weight, preferably 0.03–3 parts by weight, and more preferably 0.05–1 part by weight.

The composition of the present invention may further contain, as necessary, urethanization catalyst (E), represented by organotin compounds, and/or cross-linked polymer fine particles (F).

Urethanization catalyst (E), represented by organotin compounds, is a catalyst to promote the reaction of hydroxyl groups and silanol groups from the hydrolyzable alkoxysilyl groups in the polymer (A) and the compound (B), and isocyanato groups in the compound (C). As the above-mentioned organotin compounds there can be mentioned, for example, tetrabutyltin, tributyltin chloride, tributyltin dichloride, dibutyltin dichloride, butyltin trichloride, tributyltin o-phenolate, tributyltin cyanate, tin octylate, tin oleate, dibutyltin diacetate, dioctyltin diacetate, dibutyltin di(2-ethylhexylate), dibutyltin dioctate, dibenzyltin di(2-ethylhexylate), dibutyltin dilaurate, dibutyltin diisooctylmaleate, dibutyltin sulfide, dibutyltin dibutoxide, dibutyltin bis(o-phenylphenolate), dibutyltin bis-(acetylacetonate), di (2-ethylhexyl)tin oxide etc.

Moreover, an organotin compound represented by the following formula

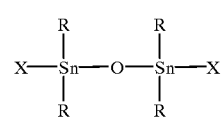

(8)

wherein four R's are same or different and each represents alkyl group; two X's are same or different and each represents halogen atom, hydroxyl group, alkoxyl group or acyloxy group, may be used as a urethanization catalyst.

As specific examples of the organotin compound represented by the above-mentioned formula (8) there can be mentioned, for example, tetra-n-butyl-1,3-diacetyloxydistannoxane, tetra-n-propyl-1,3-diacetyloxydistannoxane, tetra-n-propyl-1-chloro-3-hydroxydistannoxane, tetra-n-butyl-1-chloro-3-hydroxydistannoxane, tetramethyl-1,3-diacetyloxydistannoxane, tetramethyl-1-chloro-3-acetyloxydistannoxane, tetra-n-butyl-1,3-diformyloxydistannoxane, tetra-n-butyl-1,3-diacryloxydistannoxane, tetra-n-butyl-1,3-dilauryloxydistannoxane, tetra-n-butyl-1,3-dioleyloxydistannoxane, tetra-n-butyl-1,3-distearyloxydistannoxane, tetra-n-butyl-1,3-diphenylacetyloxydistannoxane, tetra-n-butyl-1,3-diisocyanodistannoxane, tetra-n-butyl-1-acetyloxy-3-hydroxy-distannoxane, tetra-n-propyl-1-acetyloxy-3-hydroxydistannoxane, tetramethyl-1-acetyloxy-3-hydroxydistannoxane, tetra-n-butyl-1,3-dichlorodistannoxane, tetrametyl-1,3-dichlorodistannoxane, tetra-n-butyl-1,3-dipropoxydistannoxane, tetra-n-propyl-1,3-dipropoxydistannoxane, tetra-n-butyl-1-propoxy-3-acetyloxydistannoxane, tetra-n-propyl-1-hydroxy-3-ethoxydistannoxane, 1,1-dibutyl-3,3-dipropyl-1-hydroxy-3-acetyloxydistannoxane, 1,3-dipropyl-1,3-dibutyl-1-chloro-3-hydroxydistannoxane etc.

Furthermore, as a urethanization catalyst (E), besides organotin compounds, titanium catalysts such as tetrabutyl titanate etc.; amines such as triethylamine, tributylamine etc. may be used.

In case of compounding a urethanization catalyst (E) to the composition of the present invention, its compounding amount is preferable in a range of usually not more than 0.1 part by weight, particularly 0.001–0.05 parts by weight, and more particularly 0.003–0.025 parts by weight per 100 parts by weight of the total of the polymer (A), the compound (B) and the compound (C). By compounding a urethanization catalyst (E), curing property of the coating film and the compatibility of each component constituting the coating material may be improved. When the compounding amount of the urethanization catalyst (E) exceeds 0.1 part by weight, the finishing property of the obtained coating film tends to decrease.

Crosslinked polymer fine particles (F), which may be compounded to the composition of the present invention as necessary, are particle-shaped, innerly crosslinked polymer which does not dissolve in the polymer (A), the compound (B), the compound (C) and the catalyst (D) and the solvent but can be stably dispersed into the composition of the present invention. By compounding the crosslinked polymer fine particles (F), thixotropic property can be given to the coating composition.

In case of coating a coating composition onto a vertical surface of the substrate, or at the time of baking after the coating, defects of the coating film such as sagging, cissing etc. may appear. However, if the crosslinked polymer fine particles (F) are compounded in the coating composition, though the apparent viscosity at still standing is higher, in case a high shearing stress is added such as at the time of spray coating, the viscosity becomes sufficiently low and the spray coating work may be easily done. Moreover, the thixotropic property appears shortly after coating onto the substrate and a preventive effect of coating film defects is worked out to form a good coating film without defects of the coating film such as sagging, cissing etc.

As crosslinked polymer fine particles (F), there may be used per se known intramolecularly crosslinked, fine particle-shaped polymer obtained by aqueous emulsion, aqueous suspension or nonaqueous dispersion polymerization processes. Among them, the fine particle-shaped polymer having an intramolecular crosslinked structure, obtained by aqueous emulsion or aqueous suspension polymerization processes has advantages of being separated in a form of solid by physical or chemical procedures such as evaporation or azeotropic distillation of water, precipitation or aggregation of polymer (particles) etc., or that the medium of the targeted crosslinked polymer fine particles can be replaced directly from water to another resin or organic solvent etc. at the time of conducting physical or chemical procedures.

In the present invention, as crosslinked polymer fine particles (F), there can be preferably used the crosslinked polymer fine particles obtained by emulsion polymerization of a polymerizable monomer having at least two radical polymerizable unsaturated groups in the molecule and another radical polymerizable unsaturated monomer in the presence of a reactive emulsifier having an allyl group(s) in the molecule, such as one disclosed in U.S. Pat. No. 5,348,998 (=Japanese Laid-open Patent Publication No. 66770/1991). In this case the polymer fine particles are innerly crosslinked by the polymerizable monomer having at least two radical polymerizable unsaturated groups in the molecule.

Moreover, as crosslinked polymer fine particles (F), there can be preferably used also a nonaqueous dispersion of a fine particle polymer insoluble in the organic liquid, in which said fine particle polymer is obtained by polymerization of a radical polymerizable unsaturated monomer in the presence of a dispersion stabilizing resin, which is a polymer having as an essential monomer component a vinyl monomer having alkoxysilyl groups, such as one disclosed in U.S. Pat. No. 5,198,503 (=Japanese Laid-open Patent Publication No. 95116/1989). In this case, the crosslinking is made by reactions among alkoxysilyl groups each other, based on the vinyl monomer having alkoxysilyl groups in the dispersion stabilizing resin, or between said alkoxysilyl groups and the functional groups, such as hydroxyl groups, in the polymer fine particles. Furthermore, it is preferable to innerly crosslink; polymer fine particles may be further innerly crosslinked by using as radical polymerizable unsaturated monomer forming the above-mentioned fine particle polymer, a polymerizable monomer having at least two radical polymerizable unsaturated groups in the molecule and a vinyl monomer having alkoxysilyl groups, or 2 kinds of monomers which form a combination of complementary functional groups.

As examples of the above-mentioned combination of complementary functional groups there can be mentioned a combination of isocyanate group and hydroxyl group, a combination of carboxyl group and epoxy group etc. As a vinyl monomer having isocyanate group, a monomer used in this case, there can be mentioned, for example, isocyanato-ethyl (meth)acrylate, m-isopropenyl-α,α-dimethylbenzyl isocyanate etc. As a vinyl monomer having hydroxyl group includes the above-mentioned compounds among which 2-hydroxyethyl (meth)acrylate can be preferably used. As a vinyl monomer having carboxyl group, for example, (meth)acrylic acid etc. can be mentioned and as a vinyl monomer having epoxy group, for example, glycidyl (meth)acrylate, methylglycidyl (meth)-acrylate etc. can be mentioned.

The above-mentioned crosslinked polymer fine particles have a high crosslinking density, are essentially non-swelling and non-cohesive even in an organic solvent with high polymer dissolving ability such as toluene or ethyl acetate etc., and can give a solution (dispersion) with high resin content, namely high solid content, without largely increase the viscosity of a binder resin solution or dispersion containing organic solvent in case they are added to said solution (dispersion). In the composition compounded with said cross-linked polymer fine particles both said fine particles and a binder resin form a cured coating film after drying.

The appropriate average particle diameter of the crosslinked polymer fine particles (F) is about 0.01–2 μm, preferably 0.05–0.5 μm. In case the average particle diameter lies in these ranges both sagging preventive effect and good finishing appearance of the coating film can be easily achieved.

The compounding ratio of the crosslinked polymer fine particles (F) in the composition of the present invention, in case they are compounded, is preferable in a range of usually 1–20 parts by weight, particularly 1.5–15 parts by weight, and more particularly 2–10 parts by weight, per 100 parts by weight of the total of the polymer (A), the compound (B) and the compound (C).

In the coating composition of the present invention, a so-called dehydrating agent such as trimethyl orthoacetate etc. can be compounded, as necessary, in order to inhibit the deterioration of the coating material by water existing in compounding solvents or in air.

Moreover, in the coating composition of the present invention, there can be compounded, as necessary, per se known pigments, such as color pigments, metallic pigments, iridescent color pigments, fillers, rust-preventive pigments etc.

As color pigments there can be mentioned, for example, organic pigments, such as quinacridone pigment such as Quinacridone Red etc., azo pigment such as Pigment Red etc., phthalocyanine pigment such as Phthalocyanine Blue, Phthalocyanine Green, Perylene Red etc.; inorganic pigments such as titanium oxide, carbon black etc. As metallic pigments there can be mentioned, for example, aluminium powder, nickel powder, copper powder, brass powder, chromium powder etc. As iridescent color pigments there can be mentioned, for example, pearly pearl mica powder, pearly colored pearl mica powder etc.

Furthermore, in the coating composition of the present invention, there can be compounded, as necessary, for example, various resins such as polyester resin, alkyd resin, silicone resin, fluororesin etc.; general additives for coating material such as ultraviolet absorbents, antioxidants, surface adjustment agents, defoaming agents etc.

The coating composition of the present invention can be used as an organic solvent type high solid content coating composition. As a solvent there can be used various organic solvents for coating material, for example, aromatic or aliphatic hydrocarbon solvents, alcohol solvents, ester solvents, ketone solvents, ether solvents etc. The coating composition of the present invention can be made to a high solid content coating whose solid content concentration is in a range of generally 70% or higher by weight, preferably 70–95% by weight, and more preferably 75–90% by weight.

The coating composition of the present invention can be prepared, for example, by dissolving or dispersing the above-mentioned polymer (A), the compound (B), the compound (C) and the other components as mentioned above in an organic solvent.

The coating composition of the present invention can be either of one-package or of two-package. However it is preferable to make it of two-package, separating a group of the polymer (A) and the compound (B) and a group of the compound (C), in order to prevent the lowering of storage stability due to the reaction of hydroxyl groups in the polymer (A) and the compound (B) with isocyanate groups in the compound (C). In case of two-package, it can be used by mixing each group together just before using.

The coating composition of the present invention can be easily coated by airless spray, air spray, rotary atomization coating method etc., as it may have such a low viscosity as allowing to coat, in spite of the solid content at the time of coating of 70% or higher by weight, preferably 70–95% by weight, and more preferably 75–90% by weight. These coatings may be done under the application of static electricity. The coating composition of the present invention is excellent in forming fine paraticles by these coating methods and can form a coating film excellent in smoothness, image sharpness and fatness.

The coating composition of the present invention can be used as clear coating as well as solid color coating, metallic color coating or iridescent color coating by compounding with various pigments such as color pigment, metallic pigment, iridescent color pigment etc. The coating composition of the present invention is suitable to be used as clear coating for top coat in the method of forming multilayer coating film by successively coating at least one color coating and at least one clear coating, because the coating composition of the present invention can form a cured coating film excellent in acid resistance, scratch resistance, coating appearance (for example, gloss, fatness, image sharpness) etc.

In forming a multilayer coating film, as aspects for the case of using the coating composition of the present invention as a clear coating for top coat, for example, the following aspects can be mentioned.

Aspect a: A coating method to use the coating composition of the present invention as the clear coating in a 2-coat method in which a color coating and a clear coating are successively coated.

Aspect b: A coating method to use the coating composition of the present invention as the second clear coating in a 3-coat method in which a color coating, a first clear coating and a second clear coating are successively coated.

Aspect c: A coating method to use the coating composition of the present invention as the clear coating in a 3-coat method in which a first color coating, a second color coating and a clear coating are successively coated.

These aspects a, b and c are described in more detail.

In the above-mentioned aspect a, as a color coating, there are included solid color coating, metallic color coating and iridescent color coating, and a per se known heat curable coating containing resin component, color pigment and solvent may be used.

In the above-mentioned color coating, the resin component comprises, for example, at least one basic resin such as acrylic resin, vinyl resin, polyester resin, alkyd resin urethane resin etc., which has crosslinking functional groups (for example, hydroxyl group, epoxy group, carboxyl group, alkoxysilyl group etc.), and at least one crosslinking agent component such as alkyletherified melamine resin, urea resin, guanamine resin, optionally blocked polyisocyanate compound, epoxy compound, carboxylic group-containing compound etc., in order to crosslink and cure the basic resin. Preferable using ratio is based upon a total weight of both said components, 50–90%, particularly 60–85% of the basic resin and 50–10%, particularly 40–15% of the crosslinking agent component. In the color coating there can be compounded pigments, described above as pigments to be able to be compounded in the coating composition of the present invention, such as color pigment, metallic pigment, iridescent color pigment etc. These pigments can be used alone or in combination of two or more. Moreover, the color coating may be either organic solvent type or aqueous type.

The above-mentioned aspect a can be conducted by 2-coat-1-bake method (2C1B) or 2-coat-2-bake method (2C2B) comprising that the above-mentioned color coating is coated onto a substrate made of metal or made of plastics such as those for automobiles directly, or after coating and curing of a primer such as cationic electrodepositon coating and optionally further of an intermediate coating, by a method such as airless spray, air spray, rotary atomization coating (static electricity may be optionally applied) to obtain a cured film thickness of about 10 to about 50 μm preferably about 15 to about 40 μm, cured by heating at about 100 to about 180° C., preferably at about 120 to about 160° C., for about 10 to about 40 minutes, or left without curing at room temperature for several minutes or prehaeted, then the clear coating consisting of the coating composition of the present invention is coated by a similar coating method to obtain a cured film thickness of about 10 to about 70 μm preferably about 15 to about 50 μm, and cured by heating at about 100 to about 180° C., preferably at about 120 to about 160° C., for about 10 to about 40 minutes.

In the above-mentioned aspect b, as a color coating, the same color coating as described in the item of the above-mentioned aspect a can be used. The first clear coating is a coating to form a transparent coating film and a coating constituted by eliminating almost or all of the pigments from the above-mentioned color coating (including the coating composition of the present invention) can be used. As the second clear coating, a clear coating consisting of the coating composition of the present invention can be used.

The aspect b can be conducted by 3-coat-1-bake method (3C1B), 3-coat-2-bake method (3C2B), or 3-coat-3-bake method (3C3B) comprising that, similar to the case of the aspect a, after coating and curing the color coating, or after leaving without curing at room temperature for several minutes or preheating, the above-mentioned first clear coating is coated onto the color coating film by a similar coating method to obtain a cured film thickness of about 10 to about 50 μm preferably about 15 to about 40 μm, cured by heating at about 100 to about 180° C., preferably at about 120 to about 160° C., for about 10 to about 40 minutes, or left without curing at room temperature for several minutes or preheated, then the second clear coating consisting of the coating composition of the present invention is coated by a similar coating method to obtain a cured film thickness of about 10 to about 50 μm preferably about 15 to about 40 μm, cured by heating at about 100 to about 180° C., preferably at about 120 to about 160° C., for about 10 to about 40 minutes.

In the above-mentioned aspect c, as the first color coating, the same color coating as described in the item of the above-mentioned aspect a can be used. The second color coating is coated on the surface coated by the first color coating and a color transparent coating having such a small hiding power as that the color tone of the surface coated by the first color coating (solid color, metallic color or iridescent color) can be recognized through the coating film of said second color coating is used. Thus the hiding power of the coating film of said second color coating is usually smaller than the hiding power of the coating film of the first color coating. Onto the coating film of said second color coating there is coated a clear coating, which is a coating to form a transparent coating film and the coating composition of the present invention is used.

The aspect c can be conducted by 3-coat-1-bake method (3C1B), 3-coat-2-bake method (3C2B), or 3-coat-3-bake method (3C3B) comprising that, similar to the case of the aspect a, after coating and curing the first color coating as a color coating, or after leaving without curing at room temperature for several minutes or preheating, the second color coating is coated onto the first color coating film to obtain a cured film thickness of about 10 to about 50 μm preferably about 15 to about 40 μm, cured by heating at about 100 to about 180° C., preferably at about 120 to about 160° C., for about 10 to about 40 minutes, or left without curing at room temperature for several minutes or prehaeted, then the clear coating consisting of the coating composition of the present invention is coated by a similar coating method to obtain a cured film thickness of about 10 to about 50 μm preferably about 15 to about 40 μm, cured by heating at about 100 to about 180° C., preferably at about 120 to about 160° C., for about 10 to about 40 minutes.

EXAMPLES

The present invention is hereinafter described more specifically by way of Examples and Comparative Examples. "Part(s)" and "%" are both by weight.

Preparation of vinyl polymer
Synthesis Example 1

| | |
|---|---|
| Cyclohexyl methacrylate | 15 parts |
| n-Butyl metacrylate | 7.5 parts |
| 2-Ethylhexyl metacrylate | 19.7 parts |
| 2-Hydroxyethyl metacrylate | 27.8 parts |
| γ-Methacryloxypropyltrimethoxysilane | 30 parts |

A resin solution having 75% solid content (A-1) was obtained by a solution polymerization of monomer components of the above-mentioned composition according to a usual method. The resin thus obtained has a hydroxyl value of 120 mgKOH/g, trimethoxysilyl group content of 14% (146 mg/g) and a number-average molecular weight of 3500.

Synthesis Example 2

| | |
|---|---|
| Cyclohexyl methacrylate | 19.7 parts |
| n-Butyl metacrylate | 7.5 parts |
| 2-Ethylhexyl metacrylate | 13.3 parts |
| 2-Hydroxyethyl metacrylate | 23.1 parts |
| γ-Methacryloxypropyltrimethoxysilane | 36.4 parts |

A resin solution having 75% solid content (A-2) was obtained by a solution polymerization of monomer components of the above-mentioned composition according to a usual method. The resin thus obtained has a hydroxyl value of 100 mgKOH/g, trimethoxysilyl group content of 17% (178 mg/g) and a number-average molecular weight of 5000.

Synthesis Example 3

| | |
|---|---|
| Cyclohexyl methacrylate | 15 parts |
| n-Butyl metacrylate | 6 parts |
| 2-Ethylhexyl metacrylate | 13.5 parts |
| 2-Hydroxyethyl metacrylate | 13.9 parts |
| Monomer having a silyiated hydroxyl group (*) | 21.6 parts |
| γ-Methacryloxypropyltrimethoxysilane | 30 parts |

A resin solution having 75% solid content (A-3) was obtained by a solution polymerization of the above-mentioned monomer composition according to a usual method. The resin thus obtained has a hydroxyl value of 60 mgKOH/g, trimethoxysilyl group content of 14% and a number-average molecular weight of 4000.

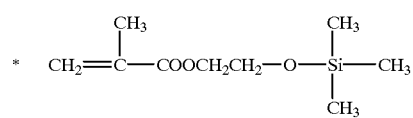

Synthesis Example 4 (for comparison)

A resin solution having 75% solid content (A-4) was obtained from the same monomer composition as Synthesis Example 1, by operating in the same manner as Synthesis Example 1, except that the compounding amount of the polymerization iniator was smaller. The resin thus obtained has a hydroxyl group value of 120 mgKOH/g, trimethoxysilyl group content of 14% (146 mg/g) and a number-average molecular weight of 12000.

Examples 1–14 and Comparative Examples 1 and 2

High solid content coating materials were obtained by using vinyl polymer resin solution (A-1), (A-2), (A-3) or (A-4), obtained by the above-mentioned Synthesis Examples 1–4 and mixing them together with each component in the ratios mentioned in Table 1 mentioned later.

Components (B), (C), (D), (E), (F) and (*1) described in Table 1 are as mentioned below, respectively.

Component (B)

(B-1): "TONE301" (Made by Union Carbide Corp.: Trade name) which is a product made by reacting 1 mole of trimethylolpropane and 3 moles of ε-caprolactone. The number-average molecular weight is about 300 and the hyroxyl group value is about 561 mgKOH/g.

(B-2): A product made by trimethylsilyl etherification of two hydroxyl groups in average, out of three hydroxyl groups in the molecule of the above-mentioned "TONE301". The number-average molecular weight is about 400 and the hyroxyl group value is about 140 mgKOH/g.

Component (C)

(C-1): "LTI" (Made by Kyowa Hakko Kogyo Co., Ltd.: Trade name). 2-Isocyanatoethyl-2,6-diisocyanatocaproate. The molecular weight is about 267 and the viscosity at 20 is about 25 mPa.s.

(C-2): 4-Isocyanatomethyl-1,8-octamethylene diisocyanate. The molecular weight is about 251 and the viscosity at 20° C. is about 10 mPa.s.

(C-3): "Desmodur N-3500" (Made by Sumitomo Bayer Urethane Co., Ltd.: Trade name). Trimer of hexamethylene diisocyanate. The molecular weight is about 504 and the viscosity at 20° C. is about 3460 mPa.s.

Component (D)

(D-1): "Nacure5543" (Made by King Industries, U.S.A.: Trade name). A solution of amine neutralization product of dodecylbenzenesulphonic acid.

Component (E)

(E-1): Dibutyltin dilaurate.

(E-2): Dibutyltin diacetate.

Component (F)

(F-1)

| | |
|---|---|
| γ-Methacryloxypropyltrimethoxysilane | 5 parts |
| Styrene | 10 parts |
| n-Butyl metacrylate | 35 parts |
| 2-Ethylhexyl metacrylate | 25 parts |
| Lauryl metacrylate | 25 parts |

Crosslinked polymer fine particles (F) obtained by copolymerization, using 100 parts of a dispersion stabilizing agent having a number-average molecular weight of 8000 consisting of a copolymer of monomer components of the above-mentioned composition, of monomer components of the following composition in a mixed solvent of heptane/xylene.

| | |
|---|---|
| γ-Methacryloxypropyltrimethoxysilane | 20 parts |
| Styrene | 15 parts |
| Acrylonitrile | 15 parts |
| Methyl methacrylate | 50 parts |

(*1) Modaflow: Trade name, made by Monsanto Co., U.S.A., Surface adjustment agent.

In Table 1, the compounding amount of the component (D) is indicated by the amount of the effective component and the compounding amounts of the other components are indicated by the amount of the solid content. NCO/OH is indicated by the equivalent ratio of the amount of isocyanate groups of the component (C) and the total amount of hydroxyl groups of the components (A) and (B).

Preparation of the test coated plate

A chemically treated dull finish cold rolled steel plate was coated with an epoxy resin type cationic electrodeposition coating material (film thickness: 25 μm) and cured by heating at 170° C. for 30 minutes, then coated with "Luga Bake AM" (Made by Kansai Paint Co., Ltd., Trade name, polyester resin/melamine resin type coating, gray color) was as an intermediate coating to 30 μm in terms of cured coating film and cured by heating at 140° C. for 30 minutes. After that the coated surface was wet sanded by #240 sand paper, dried and wiped with petroleum benzine to make the substrate.

The above-mentioned substrate was coated with an aqueous metallic coating ("TWX-402" Made by Kansai Paint Co., Ltd., Trade name, acryl/melamine resin type metallic coating containing aluminium powder) to about 18 μm in terms of cured coating film and left at room temperature for 3 minutes. Then after adjustment of viscosity to make the coating viscosity to 50 seconds (Ford cup #4, 20° C.), clear coatings of each Example and Comparative Example of the compounding shown in Table 1 were coated on the coating film before curing to about 37 μm in terms of cured film by air spray coating and left at room temperature for 3 minutes. After that said both coating films were cured at the same time by heating at 140° C. for 30 minutes to obtain test coated plates having multilayer coating film. Performance tests were done for the obtained test coated plates and the results were also mentioned in Table 1.

In Table 1, "Solid content at coating" means the solid content of a clear coating just before the coating, whose viscosity was adjusted to 50 seconds (Ford cup #4, 20° C.).

Test method

Compatibility: Clear coating of each Example and Comparative Example was coated on a glass plate to 50 μm in terms of cured film and the transparency of the coating film, cured by heating at 140° C. for 30 minutes, was judged visually. Evaluation standard is as follows.

○:good transparency

Δ: coating film is a little turbid

X: turbidity of the coating film is remarkable

The following tests were conducted for the test coated plates obtained according to the above-mentioned "Preparation of the test coated plate" in a room at 20° C.

Coating appearance: Appearance of the coated surface of the test coated plate was judged visually. Evaluation standard is as follows.

○: Smoothness, gloss and image sharpness are good and no abnormality is observed.

Δ: Any of the smoothness, gloss or image sharpness is a little inferior.

X: Any of the smoothness, gloss or image sharpness is remarkably inferior.

Coating film hardness: means Tukon hardness (20° .C) of the multilayer coating film of test coated plate.

Scratch resistance: On the coated surface of the multilayer coating film of the test coated plate, polishing powder (Daruma cleanser) was placed in a thick paste with water, put 0.5 kg load by pressing down with a terminal of a testing machine, and rubbed 25 times back and forth. The results were evaluated visually. Evaluation standard is as follows.

○: No change is observed in the gloss of the coated surface.
Δ: Gloss is reduced a little.
X: Gloss is reduced remarkably.

Acid resistance: On the coated surface of the multilayer coating film of the test coated plate 0.4 cc of 30% aqueous solution of sulphuric acid was dropped in a spot shape, heated at 60° C for 15 minutes by a hot air dryer, and washed with water. The coated surface was evaluated visually. Evaluation standard is as follows.

○: No change is observed on the coated surface.
Δ: Spot marks are observed a little.
X: Staining, whitening or blistering are remarkably observed at the spot marks.

TABLE 1

| Example No. | Example |||||||||| Comparative Example ||||||
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 | 5 | 6 |
| (A-1) | 47 | | 15 | | 47 | | 15 | | 37 | 49 | | | | | | 15 | | 47 | | |
| (A-2) | | 49 | | 15 | | 49 | | 15 | | | | | | | | | 15 | | | 49 |
| (A-3) | | | | | | | | | | | 47 | 15 | 55.5 | 28 | | | | | | |
| (A-4) | | | | | | | | | | | | | | | 15 | | | | 47 | |
| (B-1) | 20 | 20 | 25 | 25 | 20 | 20 | 25 | 25 | | 20 | 20 | 25 | | | 25 | 25 | 25 | 20 | 20 | 20 |
| (B-2) | | | | | | | | | 30 | | | | 20 | 25 | | | | | | |
| (C-1) | 33 | 31 | | | 33 | 31 | | | 33 | | 33 | | 24.5 | | | | | 33 | 33 | 31 |
| (C-2) | | | | | | | | | | 31 | | | | | | | | | | |
| (C-3) | | | 60 | 60 | | | 60 | 60 | | | | 60 | | 47 | 60 | 60 | 60 | | | |
| (D-1) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| (E-1) | 0.005 | | 0.005 | | | | | | | | | | | | 0.005 | 0.2 | 0.3 | 0.2 | | 0.2 |
| (E-2) | | 0.005 | | 0.005 | | | | | | | | | | | | | | | | |
| (F-1) | 10 | 10 | 10 | 10 | 10 | 10 | 10 | 10 | 10 | 10 | 10 | 10 | 10 | 10 | 10 | 10 | 10 | 10 | 10 | 10 |
| Modaflow (*1) | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| NCO/OH equivatent ratio | 1.2 | 1.2 | 1.1 | 1.1 | 1.2 | 1.2 | 1.1 | 1.1 | 1.2 | 1.2 | 1.2 | 1.1 | 1.0 | 1.0 | 1.0 | 1.1 | 1.1 | 1.2 | 1.0 | 1.2 |
| Solid content at coating | 74 | 73 | 75 | 75 | 74 | 73 | 75 | 75 | 78 | 74 | 78 | 78 | 73 | 74 | 62 | 75 | 75 | 74 | 59 | 73 |
| Compatibility | ○ | ○ | ○ | ○ | ○ | ○ | ○ | ○ | ○ | ○ | ○ | ○ | ○ | ○ | X | ○ | ○ | ○ | X | ○ |
| Coating appearance | ○ | ○ | ○ | ○ | ○ | ○ | ○ | ○ | ○ | ○ | ○ | ○ | ○ | ○ | X | X | Δ | X | X | Δ |
| Coating film hardness | 11 | 11 | 10 | 10 | 11 | 11 | 10 | 10 | 10 | 11 | 11 | 10 | 9 | 9 | 12 | 10 | 10 | 11 | 12 | 11 |
| Scratch resistance | ○ | ○ | ○ | ○ | ○ | ○ | ○ | ○ | ○ | ○ | ○ | ○ | ○ | ○ | Δ | ○ | ○ | ○ | Δ | ○ |
| Acid resistance | ○ | ○ | ○ | ○ | ○ | ○ | ○ | ○ | ○ | ○ | ○ | ○ | ○ | ○ | ○ | ○ | ○ | ○ | ○ | ○ |

As it is obvious from the result shown in the above-mentioned Table 1, the following effect can be achieved by the coating composition of the present invention.

(1) it is possible with the coating composition of the present invention to make the solid content at the time of coating to a high solid content concentration of not less than 70% by weight, without deteriorating the excellent properties of the conventional urethane coating materials such as acid resistance, scratch resistance, coating appearance (for example, gloss, image sharpness and fatness) etc.

(2) in the coating composition of the present invention, the compounding of the low molecular weight polyol compound (B) contributes to make the solid content higher, and still higher solid content can be achieved by silylation of the hydroxyl groups in the low molecular weight polyol compound (B)

(3) in the coating composition of the present invention, a further high solid content can be achieved by silylation of the hydroxyl groups in the polymer (A).

What is claimed is:

1. An organic solvent-based coating composition comprising
    (A) a vinyl polymer having hydroxyl groups and alkoxysilyl groups in the molecule and having a number-average molecular weight in a range of 2,000 to 10,000;
    (B) a polyol compound having a number-average molecular weight of not more 1,000 and having a hydroxyl value in a range of 120 to 1,000 mgKOH/g;
    (C) a polyisocyanate compound having a number-average molecular weight of not more than 2,000;
    (D) a silanol group-forming catalyst; and
    (E) 0 to 0.1 part by weight of a urethanization catalyst per 100 parts by weight of the total of the above-mentioned polymer (A), polyol compound (B) and polyisocyanate compound (C).

2. The composition set forth in claim 1, wherein the polymer (A) has a hydroxyl value in a range of 10 to 200 mgKOH/g.

3. The composition set forth in claim 1, wherein the polymer (A) has an alkoxysilyl group content in a range of 0.3 to 5 mmol/g.

4. The composition set forth in claim 1, wherein the polymer (A) has a number-average molecular weight in a range of 2,500 to 8,500.

5. The composition set forth in claim 1, wherein the polymer (A) contains not less than 20 mol % of the silylated groups represented by the following formula (1) which are formed by the silylation of hydroxyl groups, based on the total of the hydroxyl groups and the silylated groups

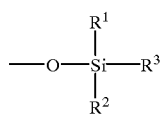

(1)

wherein $R^1$ and $R^2$ are same or different and each represents $C_{1-18}$ alkyl group, $C_{1-6}$ alkoxyl group, aryl group, aralkyl group, trimethylsiloxy group, hydrogen atom, chlorine atom or fluorine atom and $R^3$ represents $C_{1-18}$ alkyl group, aryl group, aralkyl group or trimethylsiloxy group.

6. The composition set forth in claim 5, wherein $R^1$, $R^2$ and $R^3$ each represents methyl group or ethyl group.

7. The composition set forth in claim 1, wherein the polyol compound (B) has a hydroxyl value in a range of 150 to 800 mgKOH/g.

8. The composition set forth in claim 1, wherein the molecular weight of the compound (B) is in a range of 200 to 900.

9. The composition set forth in claim 1, wherein the polyol compound (B) is a compound represented by the following formula

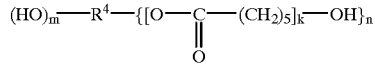

wherein $R^4$ represents $C_{2-10}$ (m+n) valent hydrocarbon group, k is an integral number of 1–3, m is an integral number of 0–2, n is an integral number of 1–3, and (m+n) is an integral number of 2–4; or acryl oligomer.

10. The composition set forth in claim 1, wherein the polyol compound (B) is a polyol compound containing more than 20 mol % of the silylated groups represented by the following formula which are formed by the silylation of hydroxyl groups, based on the total of the hydroxyl groups and the silylated groups

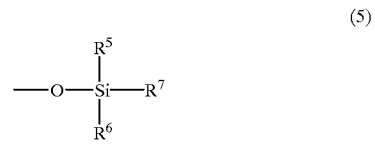

(5)

wherein $R^5$ and $R^6$ are same or different and each represents $C_{1-18}$ alkyl group, $C_{1-6}$ alkoxyl group, aryl group, aralkyl group, trimethylsiloxy group, hydrogen atom, chlorine atom or fluorine atom and $R^7$ represents $C_{1-18}$ alkyl group, aryl group, aralkyl group or trimethylsiloxy group.

11. The composition set forth in claim 1, wherein the polyisocyanate compound (C) is a low viscosity polyisocyanate compound.

12. The composition set forth in claim 11, wherein the polyisocyanate compound is selected from 2-isocyanatoethyl-2,6-diisocyanatocaproate and 4-isocyanatomethyl-1,8-octamethylene diisocyanate.

13. The composition set forth in claim 1, wherein the silanol group-forming catalyst (D) is selected from organic sulphonic acid compound, amine neutralization product of organic sulphonic acid compound, phosphoric acid compound and phosphate compound.

14. The composition set forth in claim 1 containing 20–60 parts by weight of the polymer (A) and 40–80 parts by weight of the polyol compound (B) per 100 parts by weight of the total solid content of the polymer (A) and the polyol compound (B).

15. The composition set forth in claim 1, wherein the compounding ratio of the total amount of the polymer (A) and the polyol compound (B), and the polyisocyanate compound (C) is a ratio in a range of 1:0.5–0.5:1 in terms of equivalent ratio of the total hydroxyl groups (including the silylated hydoxyl groups) of the former and the isocyanate groups of the latter.

16. The composition set forth in claim 1 containing the silanol group-forming catalyst (D) in a range of 0.01–5 parts by weight per 100 parts by weight of the total solid content of the polymer (A) and the polyol compound (B).

17. The composition set forth in claim 1, wherein the urethanization catalyst (E) is an organotin compound.

18. The composition set forth in claim 1, which further contains crosslinked polymer fine particles.

19. The composition set forth in claim 1, whose solid content at the time of coating is not less than 70% by weight.

20. A multilayer coating film-formation process characterized by using the coating composition described in claim 1 at least as the clear coating material for a top layer in a process of forming a multilayer coating film by coating by turns at least one color coating material and at least one clear coating material.

21. The process set forth in claim 20, wherein the multilayer coating film is formed by 2-coat-1-bake method characterized in that after coating a coating material which forms the color base coat, a coating material which forms the clear top coat is coated over the color base coat not yet cured, and then both coating films are cured by heating.

22. The process set forth in claim 20 wherein the substrate is an automobile body.

23. An article coated according to the process set forth in claim 20.

\* \* \* \* \*